J. M. HOLDFORD.
SNAP HOOK GUARD AND LINER.
APPLICATION FILED JULY 6, 1918.

1,290,198.

Patented Jan. 7, 1919.

Witnesses

Inventor
J. M. Holdford
By Victor J. Evans
Attorney

UNITED STATES PATENT OFFICE.

JOHN MILBURN HOLDFORD, OF BALD KNOB, ARKANSAS.

SNAP-HOOK GUARD AND LINER.

1,290,198.           Specification of Letters Patent.       Patented Jan. 7, 1919.

Application filed July 6, 1918. Serial No. 243,579.

*To all whom it may concern:*

Be it known that I, JOHN M. HOLDFORD, a citizen of the United States, residing at Bald Knob, in the county of White and State of Arkansas, have invented new and useful Improvements in Snap-Hook Guards and Liners, of which the following is a specification.

This invention is an improved snap hook guard and liner especially adapted for use in connection with a snap hook such as is commonly employed to connect a watch chain to the ring of a watch, the object of the invention being to provide an improved device of this character which is extremely cheap and simple in construction, which can be readily attached to a snap hook and which serves to line the snap hook, to prevent the ring from coming in direct contact with the snap hook and wearing the same and which also serves to prevent the snap hook from becoming casually disengaged from the ring.

With the above and other objects in view, the invention consists in the construction, combination and arrangement of devices hereinafter described and claimed.

In the accompanying drawings:—

For the purposes of this specification a snap hook is here shown at 1, such as is commonly employed to connect a watch or other chain to the ring 2 of a watch, locket or the like, the snap hook being provided with the usual pivotally mounted and spring pressed tongue 3 which closes outwardly against the hook bill 4.

Figure 1:
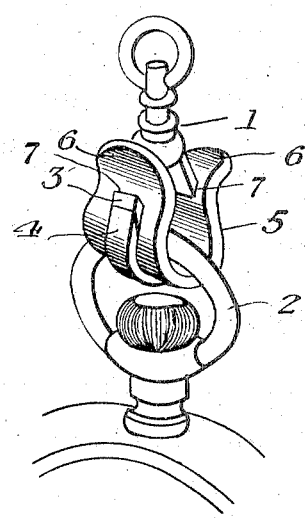
Figure 1 is a perspective view of a snap hook and watch ring provided with a guard and liner constructed and arranged in accordance with my invention.
Figure 2:
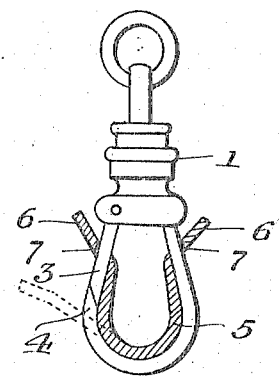
Fig. 2 is an elevation of the same and showing the guard and liner, partly in section, and on a larger scale.
Figure 3:
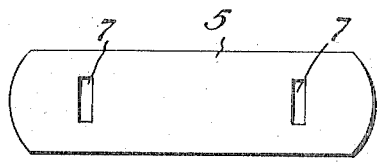

In accordance with my invention I provide a flexible guard and liner 5 which is preferably made of leather but which can be made of any suitable material. Said guard or liner is a strip which when in use is arranged in the hook and around that portion of the ring which is engaged in the hook and serves to line the hook and to prevent the ring from coming in direct contact with and wearing the hook and also prevents the hook from wearing the ring. The ends of the guard and liner are outwardly turned as at 6, and the guard and liner is provided near its ends with openings 7. The hook extends through one of the openings and the bill extends through the other and the liner, being arranged on the inner side of the bill, serves to prevent the ring from becoming casually detached from the hook, as will be understood. In order to release the ring from the hook it is necessary to slip that end of the guard and liner which engages the tongue therefrom and onto the bill, as shown in dotted lines in Fig. 2, thus enabling the tongue to be moved inwardly to open position and to clear the ring as will be understood.

Having thus described my invention, I claim:—

1. In combination with a snap hook having a spring tongue and also having a bill against which the tongue outwardly closes, a flexible guard and liner arranged on the inner side of the hook and having openings near its ends through which the hook and the shank of the tongue extend.

2. In combination with a snap hook having a spring tongue and also having a bill against which the tongue outwardly closes, a flexible guard and liner arranged on the inner side of the hook and having openings near its ends through which the hook and the shank of the tongue extend, the ends of the guard and liner being turned outwardly.

In testimony whereof I affix my signature.

JOHN MILBURN HOLDFORD.

---

Copies of this patent may be obtained for five cents each, by addressing the "Commissioner of Patents, Washington, D. C."